(No Model.) 2 Sheets—Sheet 2.

J. G. DOWNIE.
COMPENSATING GEAR FOR ROAD ENGINES.

No. 374,663. Patented Dec. 13, 1887.

Witnesses

Inventor
J. G. Downie
By his Attorneys

UNITED STATES PATENT OFFICE.

JOHN GALBRAITH DOWNIE, OF PHILADELPHIA, PENNSYLVANIA.

COMPENSATING GEAR FOR ROAD-ENGINES.

SPECIFICATION forming part of Letters Patent No. 374,663, dated December 13, 1887.

Application filed October 7, 1887. Serial No. 251,757. (No model.)

*To all whom it may concern:*

Be it known that I, JOHN GALBRAITH DOWNIE, a citizen of the United States, residing at Philadelphia, in the county of Philadelphia and State of Pennsylvania, have invented a new and useful Improvement in Compensating Gears for Road-Engines, of which the following is a specification.

My invention relates to an improvement in compensating gears for road-engines; and it consists in the peculiar construction and combination of devices, that will be more fully set forth hereinafter, and particularly pointed out in the claims.

This invention is an improvement on the compensating gear described and claimed by my brother, Robert M. Downie, in his application for Letters Patent of the United States, executed June 23, 1887; and the object of my invention is to provide a compensating gear in which a continuous shaft is employed, and thereby reduce the number of bearings necessary therefor.

Figure 1:
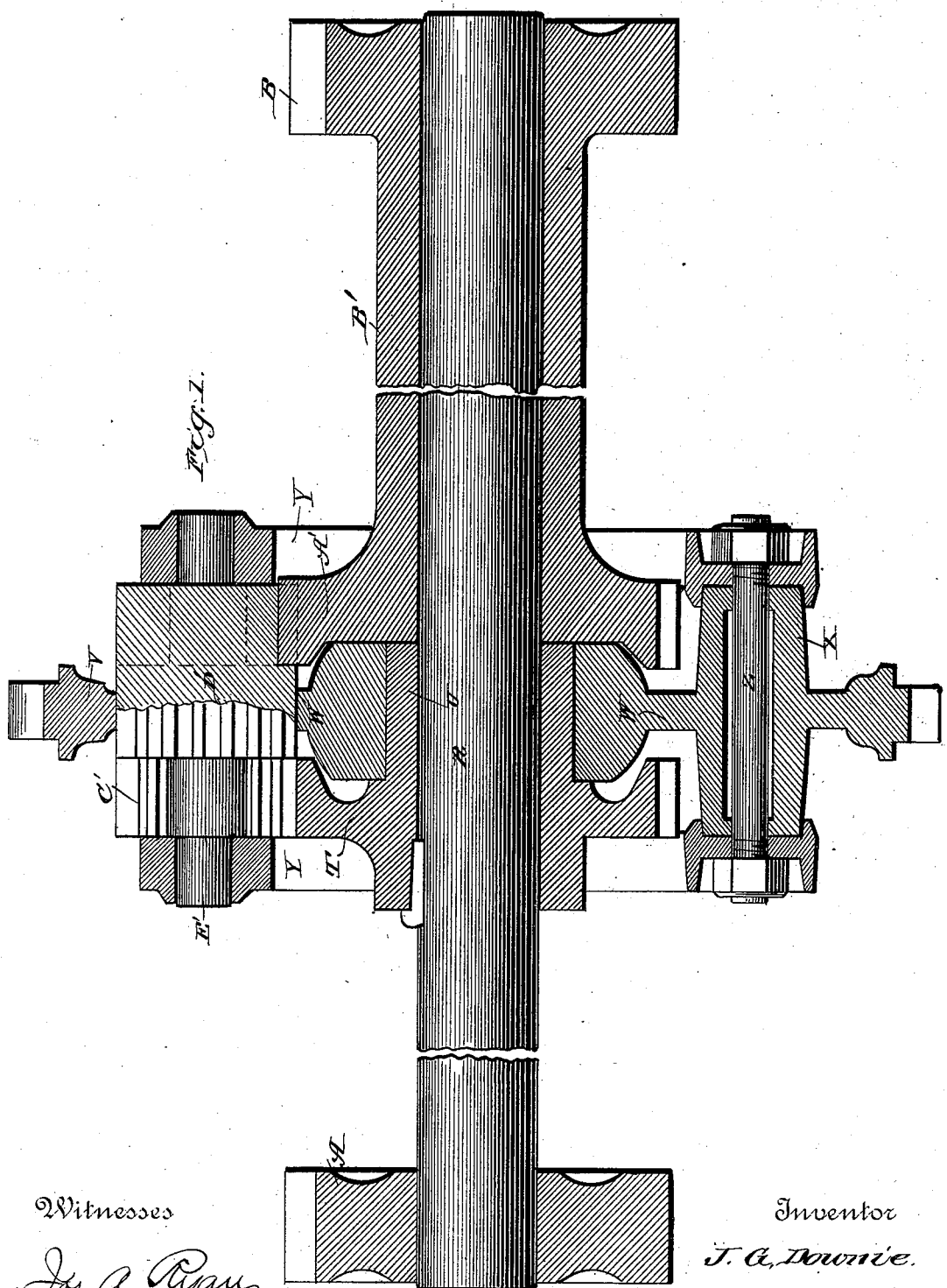
Figure 2:
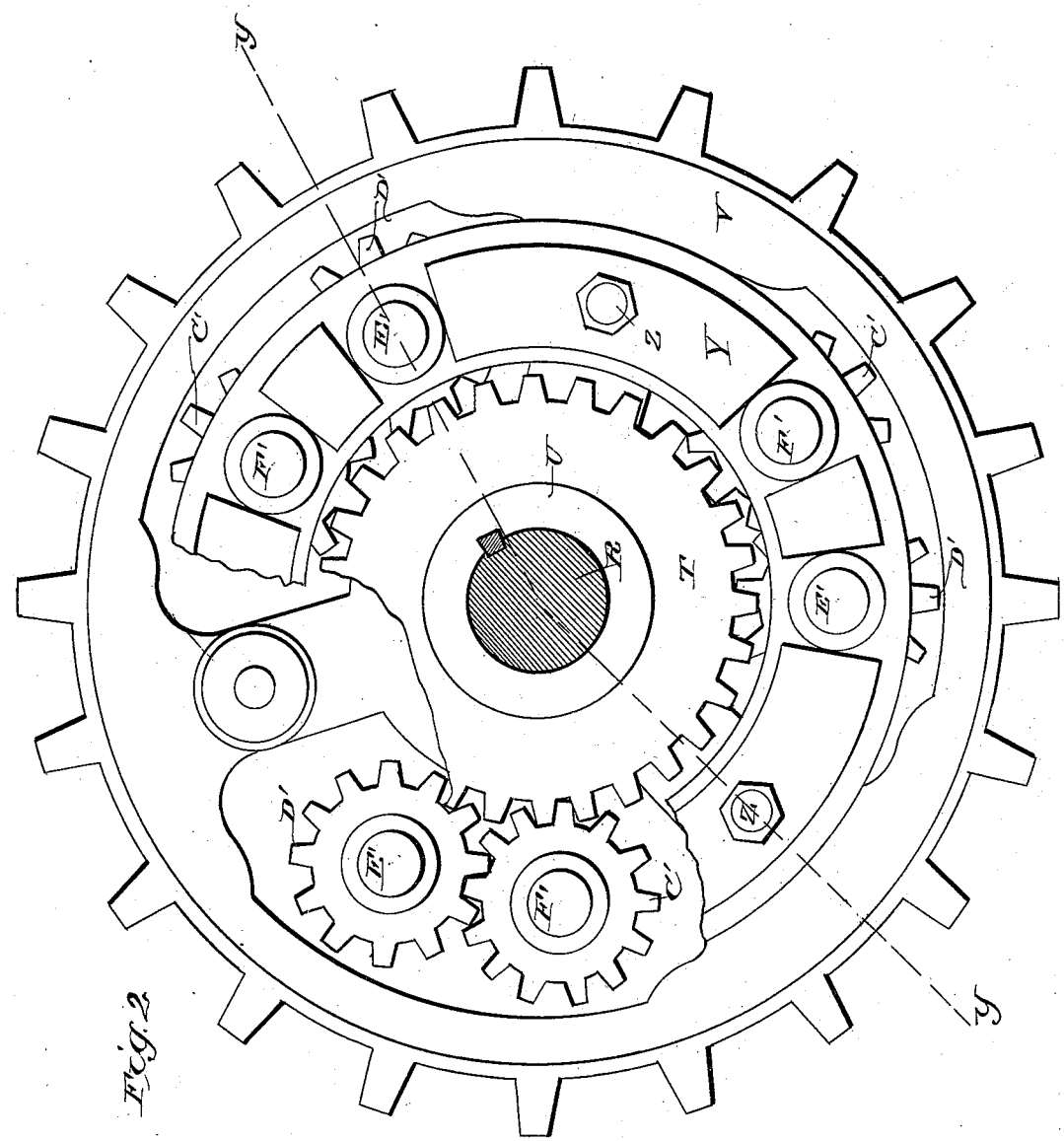

In the drawings, Figure 1 is an elevation of the compensating gear embodying my improvements. Fig. 2 is a sectional view of the same, taken on the line $xx$ of Fig. 1, and showing the pinions at the ends of the shaft.

R represents a driving-shaft, which is adapted to be journaled transversely under the bed or frame of a road-engine, (not shown,) and has at one end a keyed pinion, A, adapted to mesh with one of the driving-wheels of the engine.

T represents a spur-wheel, which is keyed to the shaft at a suitable point, and has an integral sleeve or hub, U, which projects from the inner side and fits on the shaft.

V represents a power-wheel, which is provided with a series of several radial spokes, W, which are arranged at regular distances apart, and are provided on opposite sides, near their outer ends, with projecting bosses X.

Y represents a pair of annular plates, which are secured to the ends of the bosses on both sides of the wheel V by means of transverse bolts Z, which extend through openings made in the said plates and in the said bosses. On the side of the power-wheel opposite spur-wheel T is a similar spur-wheel, A', which is loose on the shaft and has an integral sleeve, B', that projects from its outer side, and extends loosely over the shaft R to the end thereof, and formed integrally with the said sleeve and attached rigidly thereto at its outer end is a pinion, B, which is similar to the pinion A, and is adapted to mesh with the other driving-wheel of the road-engine.

From the foregoing description, and by reference to Fig. 2, it will be understood that the wheels T and A' bear against opposite sides of the wheel V, and thus retain the latter in position on the sleeve or hub U.

In the spaces formed between the radial spokes of wheels V are arranged pairs of spur-pinions C' and D', which pinions are journaled on shafts E' and F', respectively, which shafts connect the plates Y and are arranged at suitable distances apart. The width of each pinion is equal to two-thirds the width of the space between the plates Y. The pinions C' engage the spur-wheel T, and the pinions D' engage the spur-wheel A', and the overlapping inner ends of the said pinions C' and D' engage each other, as shown.

When the engine is to be propelled in a straight line and motion is imparted to the wheel V, the pinions C' and D', being geared together and also geared to the wheels T and A', remain stationary on their axes and lock the wheels T and A' to the wheel V, thereby causing the said wheels T and A' to rotate at the same rate of speed, and thereby impart rotary motion to the shaft R and cause the pinions at the ends of the said shaft to engage driving-wheels of the engine and impart motion thereto. The pinions C' and D' lock the wheel V to the sleeve so long as there is an equal resistance to both pinions C' and D'; but as soon as the resistance to one of the said pinions becomes greater than is offered to the other, when the engine is turning a curve, the speed of the resisted pinion becomes lessened, and all the power of the steam-engine is developed correspondingly upon the opposite driving-pinion, thus differentiating the power between the said pinions, as will be very readily understood.

By providing the wheel A' with the sleeve B' and pinion B the shaft R may be made in a single piece instead of in two independent sections, as described in the application of R. M. Downie, before referred to, and thereby render it necessary to employ only two bearings for the said shaft, and also adding to the strength and durability of the compensating gear and decreasing the cost of the road-engine.

Having thus described my invention, I claim—

1. The combination of the shaft R, having the rigid pinion A, the gear-wheel T, keyed to said shaft, the loosely-mounted gear-wheel A' on the shaft, having the integral sleeve B', and the integral rigid pinion B on the said sleeve, for the purpose set forth, the power-wheel V, loosely mounted on shaft R between the wheels T and A', the pinions C' and D', having their axes secured to wheel V, the said pinions engaging each other, and each of the said pinions engaging one of the wheels T and A', substantially as described.

2. In combination with the shaft R, having the wheel T keyed thereon and provided with external gear-teeth, the loosely-mounted externally-toothed gear-wheel A' on the shaft R, the power-wheel V, loosely mounted on the shaft between the wheels T A', and pinions C' D', engaging each other and also engaging the wheels T A', respectively, the plates Y, the shafts E' F' for the pinions, journaled in the plates Y, and the bolts Z, connecting the plates Y to the spokes of the wheel V, as set forth.

In testimony that I claim the foregoing as my own I have hereto affixed my signature in presence of two witnesses.

JOHN GALBRAITH DOWNIE.

Witnesses:
GEORGE W. CLEMENT,
JNO. P. CLEMENT.